Patented Sept. 24, 1946

2,408,258

UNITED STATES PATENT OFFICE 2,408,258

STABILIZED ACID SODIUM PYROPHOSPHATE AND PROCESS OF MAKING IT

Eugene N. Hetzel, St. Louis, Mo., and George E. Taylor, Anniston, Ala., assignors to Monsanto Chemical Company, a corporation of Delaware No Drawing. Application February 6, 1943, Serial No. 475,042

15 Claims. (Cl. 23—106)

This invention relates to leavening compositions comprising essentially sodium acid pyrophosphate, and has for its object the provision of a new form of sodium acid pyrophosphate. A further object is the provision of a form of sodium acid pyrophosphate which will remain substantially unchanged during storage.

Sodium acid pyrophosphate has been used as a leavening acid as such and in baking powders for a considerable number of years. Its principal use at present is by commercial bakers where it is employed for the baking of cakes. When so used, it is customary to prepare large batches of dough leavened with sodium acid pyrophosphate at the commencement of a day's operation and then to bake from this large batch of dough during the course of the day. This practice requires that the sodium acid pyrophosphate possess a slow reaction rate in the dough in order that the leavening contained in the dough be substantially unchanged during the course of the day.

A further requirement of a commercial leavening agent is that it shall remain uniform in reaction over a long period of time. Many commercial bakers mix their own baking powders from the purchased ingredients or add such purchased ingredients to the dough during mixing. These various practices are responsible for the consumer demand that the sodium acid pyrophosphate be substantially unchanged in leavening strength and reaction rate over the course of a considerable number of months.

The present manufacturing process produces sodium acid pyrophosphate by heating mono-sodium orthophosphate to a temperature sufficiently high to form the pyrophosphate by the evolution of 1 molecule of water from 2 molecules of the orthophosphate. The reaction is considered to be:

$$2NaH_2PO_4 = Na_2H_2P_2O_7 + H_2O$$

Prior art processes however paid little or no attention to the source of the raw material, that is, to the mono-sodium orthophosphate employed, the major emphasis being placed upon the temperature, time of heating and the presence of water vapor during the pyrophosphate forming reaction. McCullough, in U. S. Patent No. 2,021,012, patented November 12, 1935, described a continuous process for the production of sodium acid pyrophosphate in which process the surrounding water vapor is maintained above a certain minimum partial pressure which had been found desirable in order to prevent the formation of sodium metaphosphate in the product.

We have now found that small proportions of certain other inorganic materials should be present in the sodium orthophosphate employed as starting material and that these materials comprise essentially potash and alumina. These materials are desirably employed in the anhydrous sodium orthophosphate in amounts corresponding to about 0.16% $K_2O$ and about 0.05% $Al_2O_3$. The quantities may, however, be somewhat varied, i. e., $K_2O$ may be employed within the limits of 0.10% to 0.20% and $Al_2O_3$ between the limits of 0.25% to 0.075%. These substances are present undoubtedly as phosphates of varying composition. A further and additional requirement which we have found necessary is that the mono-sodium orthophosphate must be composed of very small crystals.

The mono-sodium orthophosphate produced by drum drying will consist of flake-like particles, each particle being made up of many small ultimate crystals. The size of the flake-like particle is of no particular importance; on the other hand, the size of the crystals is critical for the purpose of the present invention. The size of the crystals should be maintained in the neighborhood of 25 to 50 microns, that is, the majority of the crystals should be larger than 25 microns and smaller than 50 microns. Some small proportion of the crystals may be outside of this range, however, without an adverse effect upon the product.

Commercially, mono-sodium orthophosphate is customarily produced by crystallization from a mother liquor or by the drum drying of solutions thereof (evaporation to dryness) and we have found that the desired crystal size of the mono-sodium orthophosphate can be best obtained by rapid crystallization of the orthophosphate, or when employing a drum drier, by causing rapid drying of the layer of mono-sodium orthophosphate on the drum. Experiments have shown that such drying (or crystallization) to be satisfactory must take place in less than 12 seconds. By this we mean that the time of exposure of the evaporating heated layer of solution on the drum surface counting from the time of application to the roll and ending with the removal of the dried flakes from the heated surface should be less than 12 seconds.

It will be realized by those skilled in the art that in order to obtain such a speed of drying, suitable control must be had over two factors, namely, first, the temperature of the drum surface which is most readily controlled by the pressure of steam within the drum, and second, by the rate of rotation of the drum. A satisfactory drum temperature has been found to be that furnished by saturated steam under a pressure of at least 110 lbs. but preferably below 150 lbs. pressure. Employing steam within the above limits, and a suitable rate of rotation, satisfactory crystal aggregates in the form of flakes may be obtained wherein the exposure of the product to the drying temperature has been less than 12 seconds. Such a product should contain less than about 1% of free H₂O. For satisfactory drying the solution to be dried may have a specific gravity of between say 1.55 and 1.65, at 90° C.

The drum dried mono-sodium orthophosphate as produced above, may now be converted to sodium acid pyrophosphate by heating the same to a temperature within the range of 225° C. to 235° C. Satisfactory heating may be readily carried out by passing the material through a rotary kiln which is heated by means of air passing in a counter-current direction to the salt. The entering air should be heated to a temperature of from 240° C. to 250° C. When employing such a device the mono-sodium orthophosphate as the anhydrous salt will generally be introduced while it itself is at room temperature. During the course of its passage through the kiln, which passage is assured by a slight inclination of the kiln axis to the horizontal, the salt is heated from room temperature to the final temperature stated above, which temperature is reached just as the salt is discharged from the kiln. Some attention should be paid to the time of sojourn of the salt in the kiln and we have found that the time of sojourn should preferably be within the limits of from 1 hour and 45 minutes to 2 hours and 15 minutes in order to obtain the most satisfactory results.

The heated air entering the kiln may, as pointed out in the McCullough patent mentioned above, contain from 100 to 140 mm. of Hg of water vapor, the presence of which prevents the formation of sodium metaphosphate.

The salt leaving the kiln as described above and while at a temperature of from 225° C. to 235° C. is now subjected to a tempering operation for a period of from 4 to 6 hours. This operation is carried out by collecting the hot discharged salt in a heat-insulated container so that the temperature of the salt will remain substantially within the temperature range specified for an additional period of from 4 to 6 hours. The insulated container may be provided with internal agitators for the purpose of moving the salt from one end thereof to the other and thereby effecting a continuous flow of the salt through the container. During the period of sojourn therein it is desirable also to maintain a constant humidity of from 100 to 140 mm. of water vapor in order to prevent the further dehydration of the pyrophosphate to the metaphosphate.

We are aware that proposals have been made for stabilizing related leavening acids of the calcium acid phosphate type by the incorporation therein of potash and alumina. Such calcium acid phosphate products are regarded as being of the "coated" variety, wherein the impurities, mainly potash and alumina, during the formation of the calcium acid phosphate by crystallization, concentrate upon the surfaces of the crystals and upon further heating are converted to the corresponding glassy metaphosphates.

In our present invention, we do not regard the potash and alumina present in the salt as having the same function as it appears to have in the case of the calcium acid phosphate leavening compositions. Microscopic examination shows no coating upon the crystals.

While we cannot conclusively explain the chemical principles governing our discovery, it is true that the presence of the potash and alumina is not of itself sufficient to impart the desired stability to the final product. We have found that the size of the crystals of the orthophosphate employed is probably of equal importance in contributing to the desired improvement.

The herein described product may be tested by the Dough reaction rate test which is described in Cereal Chemistry, volume 8, page 423 of 1931. In conducting such tests it has become customary to measure the reaction rate by measuring the rate of carbon dioxide evolved from the moist dough. For the present purpose of evaluating sodium acid pyrophosphate leavening acids the amount of carbon dioxide evolved over the first 8 minutes of the test period is now commonly accepted as a measure of the reaction rate of the product. The rate of change of this reaction rate over a period of time is an index of the stability.

As freshly prepared according to our process, our improved product will exhibit a reaction rate of about 28. That is the acid pyrophosphate in a leavening composition containing sodium bicarbonate will liberate at 26° C., about 28% of the contained carbon dioxide over a period of time of eight minutes. After our new product has been stored for six months, the reaction rate will only be 30 to 31 or 32. In other words, the speed of the leavening reaction will have increased only 2 to 4 points.

The old prior art material having an initial reaction rate of 28 will, under the same conditions of storage, increase 5 to 6 or more points.

An added benefit afforded by our new preparation is that its reaction with sodium bicarbonate in a dough is accelerated more at elevated temperatures than is that of the acid pyrophosphate made by the old prior art. This is well illustrated by the "temperature coefficient" expressed as the ratio of the gas evolved in 2' at 50° C., to that evolved in 2' at 26° C. In one series of determinations, this temperature coefficient for the old type acid pyrophosphate was 2.75 as against 3.27 to 3.51 for our improved preparation; in another series of tests the old type product gave a temperature coefficient of 2.41 while the product prepared according to our process gave 2.95.

Typical actual percentages of gas evolved by the two products at the two temperatures are shown as follows:

|  | Per cent CO₂ at 2' | | |
| --- | --- | --- | --- |
|  | 26° C. | 50° C. | Increase |
| Product of prior art | 25.3 | 69.6 | 44.3 |
| Our new preparation | 23.3 | 77.7 | 54.4 |

The value of an increased reaction at elevated temperatures assures first, complete reaction with and neutralization of alkaline gas evolving salts which are customarily added to the dough or batter, and second, faster liberation of CO₂ during the early stages of the baking cycle when the dough or batter is still sufficiently elastic to permit maximum expansion and leavening in the finished baked product.

What we claim is:

1. The process for producing stabilized sodium acid pyrophosphate which comprises thermally evaporating a monosodium orthophosphate solution within a period of less than 12 seconds to produce substantially dry NaH₂PO₄, heating said NaH₂PO₄, in an atmosphere containing water vapor at a partial pressure of about 100 mm. to about 140 mm. of mercury, to a temperature of about 225° C. to about 235° C. until sodium acid pyrophosphate has been formed and thereafter tempering said pyrophosphate by maintaining it at a temperature of about 225° C. to about 235° C. for a period of about 4 to about 6 hours, said sodium orthophosphate solution containing about 0.10% to about 0.20% K₂O and about 0.25% to about 0.075% Al₂O₃, basis NaH₂PO₄.

2. The process for producing stabilized sodium acid pyrophosphate which comprises thermally evaporating a monosodium orthophosphate solution upon an evaporative surface within a period of less than 12 seconds to produce substantially dry NaH₂PO₄, heating said NaH₂PO₄, in an atmosphere containing water vapor at a partial pressure of about 100 mm., to about 140 mm. of mercury, to a temperature of from about 225° C. to about 235° C. until sodium acid pyrophosphate has been formed and thereafter tempering said pyrophosphate by maintaining it at a temperature of from about 225° C. to about 235° C. for a period of from about 4 to about 6 hours, said sodium orthophosphate solution containing from 0.10% to 0.20% K₂O and from 0.025% to 0.075% Al₂O₃, basis NaH₂PO₄.

3. The process for producing stabilized sodium acid pyrophosphate which comprises thermally evaporating a mono sodium orthophosphate solution upon an evaporative surface within a period of less than 12 seconds to produce substantially dry NaH₂PO₄, heating said NaH₂PO₄, in an atmosphere containing water vapor at a partial pressure of from 100 mm. to 140 mm. of mercury, to a temperature of from 225° C. to 235° C. until sodium acid pyrophosphate has been formed and thereafter tempering said pyrophosphate by maintaining it, in an atmosphere containing water vapor at a partial pressure of from 100 mm. to 140 mm. of mercury, at a temperature of from 225° C. to 235° C. for a period of from 4 to 6 hours, said monosodium orthophosphate solution containing from 0.10% to 0.20% K₂O and from 0.025% to 0.075% Al₂O₃, basis NaH₂PO₄.

4. The process for producing stabilized sodium acid pyrophosphate which comprises drum drying a monosodium orthophosphate solution within a period of less than 12 seconds to produce substantially dry NaH₂PO₄, heating said NaH₂PO₄, in an atmosphere containing water vapor at a partial pressure of from 100 mm. to 140 mm. of mercury, to a temperature of from 225° C. to 235° C. until sodium acid pyrophosphate has been formed and thereafter tempering said pyrophosphate by maintaining it at a temperature of from 225° C. to 235° C. for a period of from 4 to 6 hours, said monosodium orthophosphate solution containing from 0.10% to 0.20% K₂O and from 0.025% to 0.075% Al₂O₃, basis NaH₂PO₄.

5. The process for producing stabilized sodium acid pyrophosphate which comprises drum drying a monosodium orthophosphate solution within a period of less than 12 seconds to produce substantially dry NaH₂PO₄, heating said NaH₂PO₄, in an atmosphere containing water vapor at a partial pressure of from 100 mm. to 140 mm. of mercury, to a temperature of from 225° C. to 235° C. until sodium acid pyrophosphate has been formed and thereafter tempering said pyrophosphate by maintaining it, in an atmosphere containing water vapor at a partial pressure of from 100 mm. to 140 mm. of mercury, at a temperature of from 225° C. to 235° C. for a period of about 4 to 6 hours, said monosodium orthophosphate solution containing from 0.10% to 0.20% K₂O and from 0.025% to 0.075% Al₂O₃, basis NaH₂PO₄.

6. The process defined in claim 5 wherein a monosodium orthophosphate solution having a specific gravity of from 1.55 to 1.65 at 90° C. is employed.

7. The process for producing stabilized sodium acid pyrophosphate which comprises drum drying a monosodium orthophosphate solution within a period of less than 12 seconds to produce substantially dry NaH₂PO₄, heating said NaH₂PO₄, in an atmosphere containing water vapor at a partial pressure of from 100 mm. to 140 mm. of mercury, to a temperature of from 225° to 235° C. until sodium acid pyrophosphate has been formed and thereafter tempering said pyrophosphate by maintaining it, in an atmosphere containing water vapor at a partial pressure of from 100 mm. to 140 mm. of mercury, at a temperature of from 225° C. to 235° C. for a period of about 4 to 6 hours, said monosodium orthophosphate solution containing about 0.16% K₂O and about 0.05% Al₂O₃, basis NaH₂PO₄.

8. The process for producing stabilized sodium acid pyrophosphate which comprises drying a monosodium orthophosphate solution within a period of less than 12 seconds upon a drum dryer heated by saturated steam under at least 110 lbs. but preferably below 150 lbs. pressure to produce substantially dry NaH₂PO₄, converting said NaH₂PO₄ into sodium acid pyrophosphate by passing it through a rotary kiln countercurrent to a stream of air having an entering temperature of from 240° C. to 250° C. and containing water vapor at a partial pressure of from 100 to 140 mm. of mercury, discharging said sodium acid pyrophosphate while at a temperature of from 225° C. to 235° C. from said kiln into a heat-insulated container and then tempering said pyrophosphate by maintaining it, in an atmosphere containing water vapor at a partial pressure of from 100 mm. to 140 mm. of mercury, at a temperature of from 225 to 235° C. for a period of about 4 to 6 hours, said monosodium orthophosphate solution having a specific gravity of 1.55 to 1.65 at 90° C. and containing from 0.10% to 0.20% K₂O and from 0.025% to 0.075% Al₂O₄, basis NaH₂PO₄.

9. The process defined in claim 8 wherein the sojourn time of the salt in the rotary kiln lies within the limits of from 1¾ hours to 2¼ hours.

10. Stabilized sodium acid pyrophosphate produced by the method defined in claim 1.

11. Stabilized sodium acid pyrophosphate produced by the method defined in claim 3.

12. Stabilized sodium acid pyrophosphate produced by the method defined in claim 5.

13. Stabilized sodium acid pyrophosphate produced by the method defined in claim 7.

14. Stabilized sodium acid pyrophosphate produced by the method defined in claim 8, said pyrophosphate when incorporated into a leavening composition, exhibiting when freshly prepared a reaction rate of about 28% of the contained carbon dioxide and said reaction rate increasing not more than 4% when stored for 6 months.

15. Stabilized sodium acid pyrophosphate produced by the method defined in claim 8, said pyrophosphate having a "temperature coefficient" of from 2.95 to 3.51 when reacted with sodium carbonate in a dough mixture.

EUGENE N. HETZEL.
GEORGE E. TAYLOR.